Figure 1:
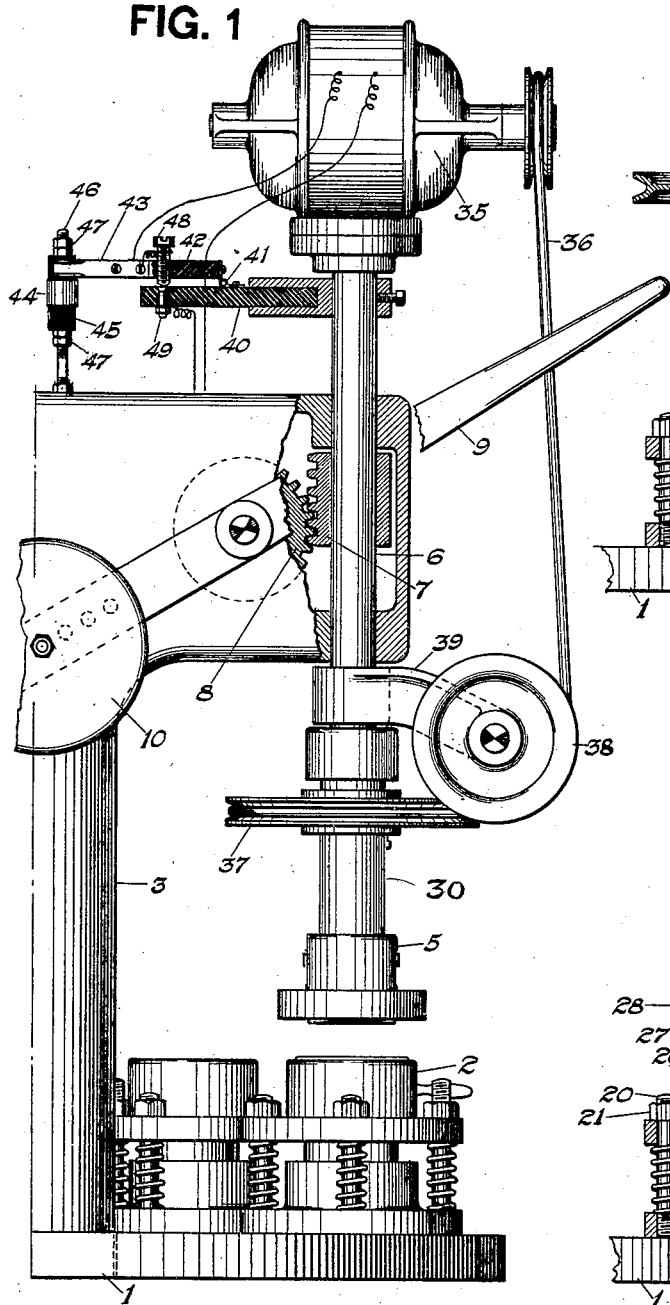

No. 859,307. PATENTED JULY 9, 1907.
J. S. LUCOCK.
GLASS MOLDING MACHINE.
APPLICATION FILED AUG. 6, 1906.

2 SHEETS—SHEET 1.

WITNESSES.
INVENTOR

No. 859,307. PATENTED JULY 9, 1907.
J. S. LUCOCK.
GLASS MOLDING MACHINE.
APPLICATION FILED AUG. 6, 1906.
2 SHEETS—SHEET 2.
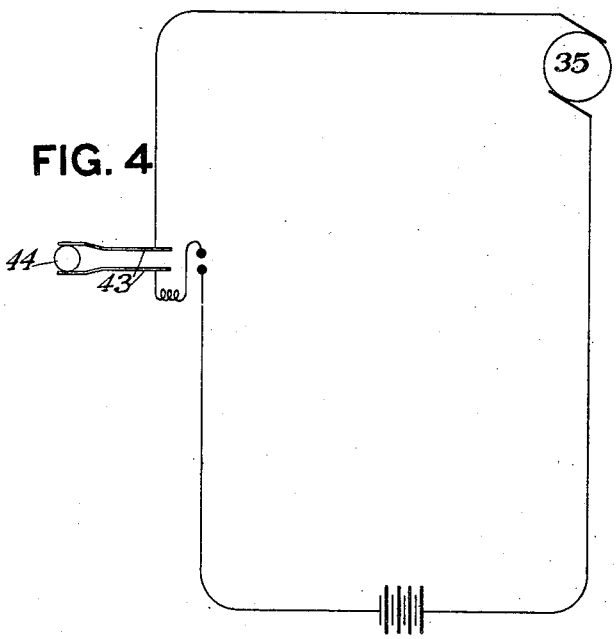
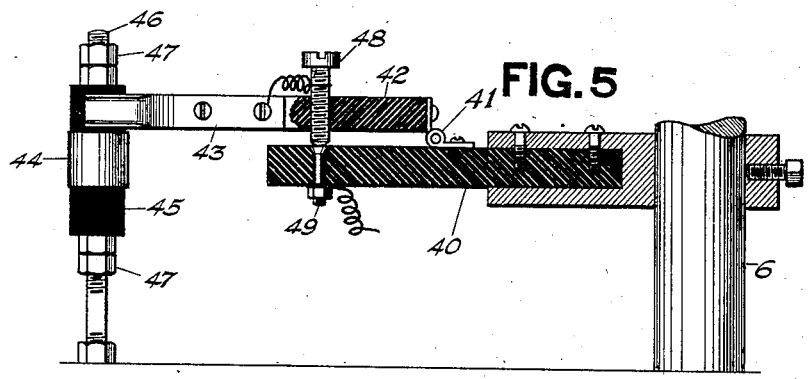
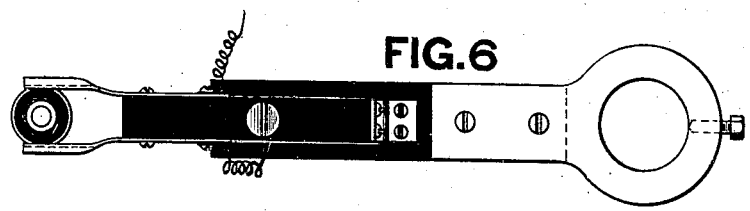
WITNESSES. INVENTOR.

UNITED STATES PATENT OFFICE.

JOHN S. LUCOCK, OF WASHINGTON, PENNSYLVANIA.

GLASS-MOLDING MACHINE.

No. 859,307.　　　　Specification of Letters Patent.　　　　Patented July 9, 1907.

Application filed August 6, 1906. Serial No. 329,354.

*To all whom it may concern:*

Be it known that I, JOHN S. LUCOCK, a resident of Washington, in the county of Washington and State of Pennsylvania, have invented a new and useful Improvement in Glass-Molding Machines, (Case 2;) and I do hereby declare the following to be a full, clear, and exact description thereof.

This invention relates to a machine for molding plastic materials in the form of a cup or the like having internal threads, and more especially to a machine for molding glass caps for fruit jars and the like.

The object of the invention is to provide machines of this character with mechanism for automatically withdrawing the threaded former or presser immediately after the pressing operation is completed, in order to prevent the adherence of the molded article to the former, due to the contraction of the article and expansion of the former.

Glass caps for fruit jars and the like are provided with internal threads and are comparatively thin, so that they cool rapidly after pressing. In cooling, the cap naturally shrinks while the threaded presser used to form the internal threads becomes heated and expands. Consequently, if the plunger is not immediately withdrawn the cap adheres very tightly thereto making it difficult to remove the former.

All forms of apparatus heretofore devised for making internally threaded articles, such as insulators, have been provided with a series of molds and the arrangement has been such that the pressing was done in one position or station and the threaded former removed at a succeeding position or station, the former being separated from the pressing mechanism or plunger and not being withdrawn when the latter moves upwardly. As a consequence, in such machines there is a considerable interval of time between the pressing and the removal of the threaded former from the article. With insulators and the like this is not detrimental since said articles have a comparatively large body of glass which cools slowly, and the interval of time is useful in giving the glass time to set. This arrangement, however, is objectionable when forming articles having a thin body of glass, such as fruit jar caps and the like, for the reason that this thin body cools very rapidly, shrinking down on the threaded former and adhering thereto with such firm grip that a large percentage of breakage occurs in removing the former. My invention is designed to overcome this difficulty, and it provides automatic mechanism whereby the threaded former is withdrawn immediately after the pressing operation and at the same station or position on a rotary machine at which the pressing takes place.

The invention consists of the arrangement of mechanism hereinafter described and claimed.

Figure 2:
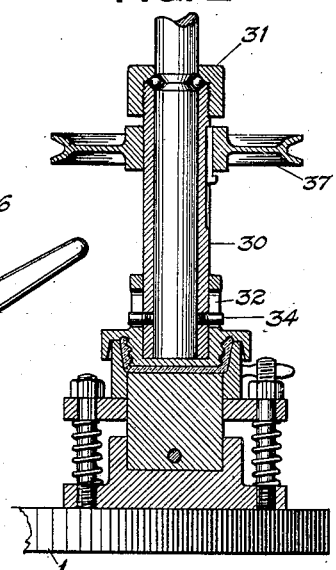
Figure 3:
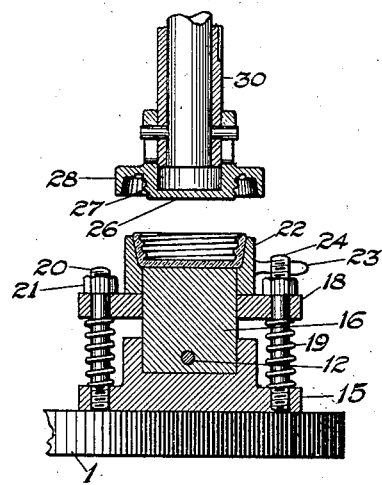

In the accompanying drawings, Figure 1 is in part a side view, and in part a vertical section of a portion of a machine showing my invention applied thereto; Figs. 2 and 3 are vertical sections showing the molds and plunger in different positions, Fig. 4 is a diagram of the electric circuit, and Figs. 5 and 6 are respectively a side and a plan view of the circuit closer.

In the drawings, the invention is shown applied to what is known as a hand glass molding or pressing machine, but this has been selected largely for purposes of illustration. I wish it understood, therefore, that no limitations are to be imposed on the terms of the claims hereinafter made by either the specific illustration or specific description of apparatus, since the invention can be applied to various types of machines, and furthermore, the instrumentalities by which the several functions of my invention are effected may be varied within wide limits.

Inasmuch as glass molding and pressing machines of the general type shown are quite largely used and are well understood, it has been thought necessary to illustrate only in general outline the portion of the machine with which my improvements co-operate. Accordingly, no mechanism for rotating or indexing the mold table has been shown, and other parts of the machine are shown only in outline. These old parts may be of any desired form.

In the drawings 1 indicates a portion of a rotary table carrying a series of molds 2. The particular machine to which this invention is shown applied has five such molds (two only being shown), but obviously this number may be increased or decreased at will. The table 1 is mounted on a suitable base, not shown, and is rotatable about the central column 3. As stated, this table can be rotated and indexed by any suitable means or in any suitable way.

Co-operating with the molds 2 is a threaded former or presser 5 carried by reciprocating pressing mechanism or plunger 6, only one such presser being used for the series of molds, the latter being brought in succession underneath the presser. The plunger 6 may be actuated by any suitable reversing mechanism, the drawings showing the same provided with a rack 7 engaged by a pinion 8, which latter is actuated by means of a handle 9 having an adjustable counter-weight 10 which serves to lift or retract the plunger. This is a well known type of hand glass molding machine and needs no further description.

The mold 2 is of special construction, comprising a suitable base piece 15 provided with a cup or recess in which the mold bottom member 16 is secured by means of a set screw 12. Surrounding the bottom member 16 is a plate 18 which is normally held elevated by springs 19, surrounding bolts 20 which pass up through openings in the plate and whose heads 21 limit the upward movement of said plate. Upon this plate rests the collar member 22 of the mold, being provided with upwardly projecting walls of the proper contour to give the desired external shape to the article being molded. This collar is provided with a handle 23 by means of which it can be taken off and replaced. A suitable stop is provided to prevent this collar from rotating, the drawings showing a stop formed by an upwardly extended portion 24 by one of the bolts 20.

The presser or former 5 co-operating with the mold is provided with a central projecting portion 26 having thereon threads 27 for forming the internal threads in the article being molded. The former may also be provided with the circumferential flange portion 28 which projects over the edges of the mold 22. This flange portion, however, may be a separate ring serving as a cover for the mold and adapted to have the former pass through its opening. The former 5 preferably is mounted to have rotary movement on the reciprocating plunger or pressing mechanism 6, this being accomplished by connecting the former 5 to a sleeve member 30 rotatable on the lower end of the plunger 6, and held from dropping off by any suitable means such as the anti-friction balls 31 running in a groove in the plunger and the co-operating race provided on the sleeve 30. Preferably also, the former 5 will be mounted to have a sliding but non-rotary movement on the sleeve 30, this being effected by providing co-operating slots 32 and pins 34 between these parts, the drawing showing the pins connected to the sleeve member 30 and the slots formed in the presser or former 5. This sliding movement is of aid in preventing the former from stripping or distorting the threads in the article on its upward movement.

The mechanism for rotating the former or presser may be of various forms. It is shown as an electric motor 35 preferably mounted on the upper end of the pressing mechanism or plunger 6 and having its armature shaft connected by a belt 36 to a pulley 37 on the sleeve member 30. This belt passes over suitable guide sheaves 38 mounted in brackets 39 secured to the lower end of the plunger 6, so that the motor, the transmitting mechanism, the plunger, and the rotating presser or former all move together vertically in the operation of the machine.

Means are provided for rotating the presser or former only during its upward movement as shown. This is accomplished automatically from the reciprocating plunger 6 by means of a suitable circuit maker and breaker for the motor comprising an arm 40 carried by the plunger 6 and having connected thereto, preferably by a hinged connection 41, an insulating block 42 provided with a pair of spring contact fingers 43. Co-operating with these fingers is a circuit closing metallic ring 44 mounted on an insulating body 45 which is adjustably secured to the frame of the machine, such as by means of a threaded rod or bolt 46 having thereon adjusting nuts 47. One wire of the circuit is connected to one of the contact fingers 43 and the other of the fingers 43 is electrically connected to a suitable metallic member, such as a screw 48 passing through the insulating block 42 and contacting with a similar member 49 in the insulating arm 40. The other circuit wire is connected to the contact 49 and these two metallic members 48 and 49 provide contact points at which the circuit may be made or broken.

In the operation of the mechanism described, the glass is cut into the molds and the latter are brought in succession underneath the pressing plunger. The operator then draws down on the handle 9 which through the pinion and rack serves to depress the plunger, forcing the former down into the molten glass in the mold and pressing the article to shape. During this downward movement the circuit controlling arm 40 also moves downwardly and the spring contact fingers 43 bear frictionally against the contact ring 44. As a consequence, the insulating block 42 swings on the hinge 41 breaking the circuit between contacts 48 and 49. Consequently, the motor 35 is idle during the downward movement of the plunger. As soon as the operator releases the handle 9 the counter-weight 10 elevates the plunger and this counter-weight can be adjusted so as to elevate the plunger to just the right speed in order to prevent stripping or distortion of the threads in the article. During this upward movement the circuit-closing arm also moves upwardly and when the spring fingers engage the ring 44 the friction is sufficient to force the block 42 downwardly, causing the circuit to be closed between the contacts 48 and 49. Consequently, the circuit to the motor is closed and said motor becomes active, thus rotating the former 5 to unscrew it from the threaded article during this upward movement. It is only necessary to continue this rotation sufficiently long to entirely withdraw the former from the molded article, after which the rotation is not longer necessary. Consequently, the circuit closing ring 44 is made only of sufficient width to keep the circuit closed during the required period of time.

In the operation of pressing the mold ring 22 moves downwardly, due to the yielding of the springs 19. This yielding movement is provided in order to compensate for variations in quantity of glass cut into the mold, this variation appearing in the thickness of the top of the molded cap. Consequently, when the presser begins to rise the mold ring 22 is also raised by the springs 19. It is inadvisable to begin the rotation of the former until the upward movement of the mold has ceased. Consequently, the circuit closing ring 44 will be adjusted by means of the nuts 47 to such position that the contact fingers 44 do not come in contact therewith until the limit of the upward movement of the mold.

In operating the machine the attendant need perform no duties other than are common in machines of this character, the operations of starting and stopping the motor and rotating the former being performed entirely automatically. By means of this mechanism, the former is automatically withdrawn from the article immediately upon the beginning of the upward movement of the pressing plunger. At this time the glass has set but not materially cooled and the former itself has not had time to become materially heated. Consequently, the contraction of the one and the expansion of the other are negligible, making the withdrawal of the former easy. In prior machines for forming insulators and the like, the pressing element or plunger has necessarily been lifted immediately after the pressing operation, but the former or threaded element has remained for withdrawal at a later stage of the operation. In my machine, however, the former or threaded element of the pressing mechanism or plunger are connected so that when the latter is elevated the former must necessarily be withdrawn.

This invention may be applied to any form of plastic molding apparatus, whether for molten glass or other material. It is not limited to a machine having a series of molds, nor to a machine having its presser moved by hand, but can be equally as well applied to a machine having any kind of reciprocating pressing mechanism, it merely being necessary to control the circuit for the former rotating motor from the reciprocating pressing mechanism.

What I claim is.

1. Molding apparatus comprising in combination, a mold, a co-operating threaded former, a non-rotating presser on which the former is rotatably mounted, presser lifting means and former rotating means arranged to operate simultaneously.

2. Molding apparatus comprising in combination, a mold, a co-operating threaded former, reciprocating pressing mechanism on which the former is rotatably mounted, and mechanism operating on the upward movement of the pressing mechanism for rotating the former on the pressing mechanism.

3. Molding apparatus comprising in combination, a mold, a co-operating threaded former, reciprocating pressing mechanism on which the former is rotatably mounted, and mechanism automatically brought into operation on the lifting movement of the pressing mechanism for rotating the former on the pressing mechanism.

4. Molding apparatus comprising in combination, a mold, a co-operating threaded former, reciprocating pressing mechanism on which the former is rotatably mounted, and mechanism actuated automatically from the pressing mechanism on its lifting movement and acting to rotate the former on the pressing mechanism.

5. Molding apparatus comprising in combination, a mold, a co-operating threaded former, reciprocating pressing mechanism on which the former is rotatably mounted, mechanism for rotating the former on the pressing mechanism, and means controlled by the pressing mechanism on its lifting movement for rendering said rotating mechanism active.

6. Molding apparatus comprising in combination, a mold, a co-operating threaded former, reciprocating pressing mechanism on which the former is rotatably mounted, mechanism for rotating the former on the pressing mechanism, and a controller for said rotating mechanism carried by a reciprocating element.

7. Molding apparatus comprising in combination, a mold, a co-operating threaded former, reciprocating pressing mechanism on which the former is rotatably mounted, mechanism carried by the reciprocating pressing mechanism for rotating the former thereon, and means for rendering said former rotating mechanism active during the upward movement of the pressing mechanism.

8. Molding apparatus comprising in combination, a mold, a co-operating threaded presser mounted for reciprocation and for rotation independently of the reciprocation, mechanism for reciprocating said presser, presser rotating mechanism, and an electric circuit controlled by the reciprocating mechanism for actuating said rotating mechanism.

9. Molding apparatus comprising in combination, a mold, a co-operating threaded former, pressing mechanism to which said former is attached, former rotating mechanism, and an electric circuit controlled by the pressing mechanism for actuating said rotating mechanism.

10. Molding apparatus comprising in combination, a mold, a co-operating threaded presser mounted for reciprocation and for rotation independently of the reciprocation, rotating mechanism therefor, and an electric circuit arranged to be closed by the reciprocation of the presser and arranged to actuate the rotating mechanism.

11. Molding apparatus comprising in combination, a mold, a co-operating threaded presser mounted for reciprocation and for rotation independently of the reciprocation, presser rotating mechanism, and adjustable means controlled by the reciprocation of the presser for actuating the rotating mechanism.

12. Molding apparatus comprising in combination, a mold, a co-operating threaded presser mounted for reciprocation and for rotation independently of the reciprocation, presser lifting means, presser rotating mechanism, an electric circuit for rendering said rotating mechanism active, and a circuit controller actuated from a reciprocating element.

13. Molding apparatus comprising in combination, a mold, a co-operating threaded presser mounted for reciprocation and for rotation independently of the reciprocation, presser lifting means, presser rotating mechanism, an electric circuit for rendering said rotating mechanism active, and a circuit controller carried by a reciprocating element.

14. Molding apparatus comprising in combination, a mold, a co-operating threaded presser mounted for reciprocation and rotation, presser lifting means, presser rotating mechanism, an electric circuit for rendering the rotating mechanism active, and circuit controlling means arranged to close said circuit on the lifting movement and to hold the same open on a downward movement.

15. Molding apparatus comprising in combination, a mold, a co-operating threaded presser mounted for rotation, reciprocating mechanism carrying said presser, a motor and presser rotating means carried by said reciprocating mechanism, and controlling means for rendering the rotating mechanism active when the reciprocating mechanism is lifted.

16. Molding apparatus comprising in combination, a mold, co-operating reciprocating pressing mechanism, a threaded former rotatably mounted on said reciprocating mechanism, former rotating mechanism comprising an electric circuit, and circuit closing means controlled from the reciprocating pressing mechanism.

17. Molding apparatus comprising in combination, a mold, co-operating reciprocating pressing mechanism, a threaded former rotatably mounted on said pressing mechanism, an electric motor also mounted on said reciprocating mechanism and operatively connected to the rotatable former, and circuit controlling means for the motor operated from the reciprocating pressing mechanism.

18. Molding apparatus comprising in combination, a mold, co-operating reciprocating pressing mechanism, a threaded former rotatably and slidably mounted on said pressing mechanism, rotating mechanism for said former, and means for rendering said mechanism active on the upward movement of the reciprocating mechanism.

19. Molding apparatus comprising in combination, a mold, co-operating reciprocating pressing mechanism, a threaded former rotatably and slidably mounted on said pressing mechanism, and mechanism automatically brought into operation on the lifting movement of the reciprocating mechanism and arranged to rotate the former on said reciprocating mechanism.

20. Molding apparatus comprising in combination, a mold, co-operating reciprocating pressing mechanism, a threaded former rotatably and slidably mounted on said pressing mechanism, mechanism for rotating the former on the pressing mechanism, and a controller for said rotating mechanism carried by a reciprocating element.

21. Molding apparatus comprising in combination, a mold, a co-operating non-rotating, reciprocating presser, a threaded former rotatably mounted on said presser, presser lifting means and former rotating means arranged to operate simultaneously.

22. Molding apparatus comprising in combination, a mold, a co-operating threaded presser mounted for reciprocation and rotation, presser lifting means, presser rotating mechanism including an electric circuit, and circuit controlling means comprising co-operating contact fingers and a bridging member, one carried by the presser lifting means and the other being stationary.

23. Molding apparatus comprising in combination, a mold, a reciprocating threaded presser mounted for reciprocation and rotation, presser lifting means, presser rotating mechanism including an electric circuit, and circuit controlling means comprising a switch arm and a co-operating contact, one being stationary and the other carried by the presser lifting means, said arm being pivoted and arranged to automatically break the circuit on the downward movement of the lifting means, and to close the circuit on the upward movement of the lifting means.

24. Molding apparatus comprising in combination, a mold, a co-operating threaded presser mounted for reciprocation and rotation, presser lifting means, presser rotating mechanism. including an electric circuit, circuit controlling means comprising an arm carried by the lifting means, a block hinged to said arm, said block and arm carrying circuit closing contacts, and a stationary member with which said pivoted block frictionally engages in its upward and downward movements thereby to separate said contacts on the downward movement and close them on the upward movement.

25. Molding apparatus comprising in combination, a mold, a co-operating threaded presser, reciprocating mechanism to which said presser is rotatably attached, rotating mechanism for said presser, and a sliding connection between the presser and reciprocating mechanism.

26. Molding apparatus comprising in combination, a mold, a co-operating threaded presser mounted for reciprocation and rotation, said presser being slidably connected to its actuator.

27. Molding apparatus comprising in combination, a vertically yielding mold, a co-operating threaded presser mounted for reciprocation and rotation, and presser rotating mechanism arranged to be brought into action on the limit of the upward movement of the mold.

28. Molding apparatus comprising in combination, a mold mounted to yield vertically, a co-operating threaded presser mounted for reciprocation and rotation, presser reciprocating means, presser rotating mechanism, and adjustable means for rendering the rotating mechanism active on the lifting movement of the presser when the mold reaches the limit of its upward movement.

29. Molding apparatus comprising in combination, a mold mounted to yield vertically, a co-operating threaded presser mounted for reciprocation and rotation, presser reciprocating means, presser rotating mechanism including an electric circuit, and an adjustable circuit controller actuated when the mold reaches the limit of its upward movement.

In testimony whereof, I the said JOHN S. LUCOCK have hereunto set my hand.

JOHN S. LUCOCK.

Witnesses:
F. W. WINTER,
M. D. VOGEL.